May 18, 1965  E. R. ALMDALE  3,184,259
CARBIDE TIPPED ARTICLES AND METHOD FOR MAKING SAME
Filed Nov. 14, 1962
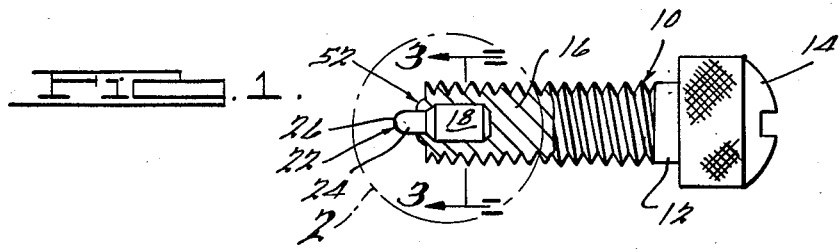
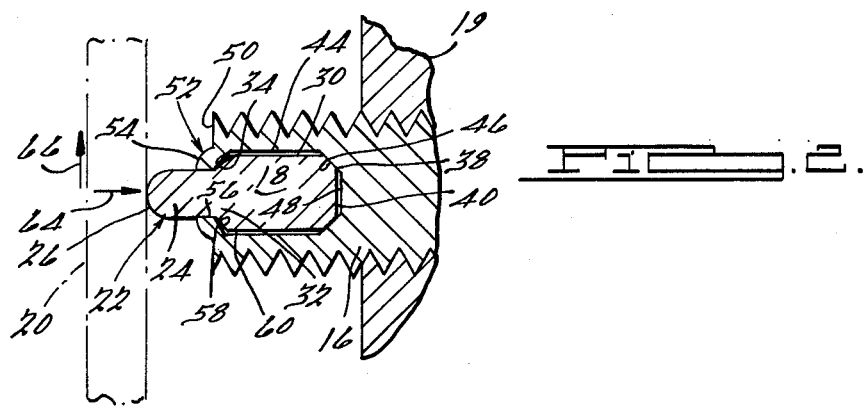
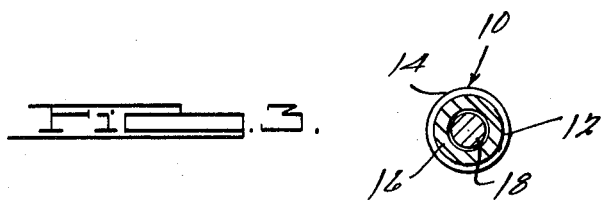
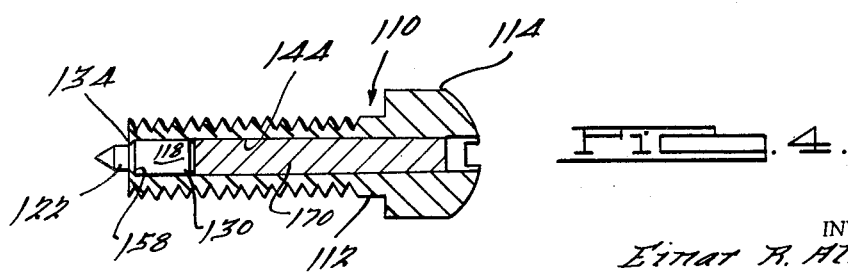
INVENTOR.
Einar R. Almdale
BY
Harness, Dickey & Pierce
ATTORNEYS

United States Patent Office 3,184,259
Patented May 18, 1965

3,184,259
CARBIDE TIPPED ARTICLES AND METHOD
FOR MAKING SAME
Einar R. Almdale, Ann Arbor, Mich., assignor to The
Walmet Corporation, Pleasant Ridge, Mich., a corporation of Michigan
Filed Nov. 14, 1962, Ser. No. 237,492
7 Claims. (Cl. 294—86)

This invention relates to ferrous articles including cemented carbide inserts and more particularly relates to steel articles of the type provided with a carbide insert surrounded by the steel but having an end portion projecting therefrom, such as the screw members used on tongs for handling hot sheet glass. This invention also concerns a method for making such articles.

In the field of tools containing inserts of cemented carbide, that is, tungsten or similar heavy metal carbide cemented with cobalt or nickel, the problem of attachment of the carbide to the supporting portion of the tool is ever present. The attachment of carbide to steel may be accomplished either mechanically or by brazing. Mechanical attachment requires provision of means which lock the carbide to the steel, such as clamps, screws, wedges or the like and usually enlarges the tool considerably both in size and in cost. The majority of carbide is attached to steel by brazing with copper or lower melting point materials such as silver solder, and for a wide variety of parts including cutting tools, hobs, saws, dies, broaches, etc., brazing is adequate and commercially satisfactory. It is known that the approximately double rate of thermal expansion of steel relative to cemented carbide creates stresses in the brazing material which result from the difference in contraction of the steel and carbide as the brazed part cools down to room temperature from brazing temperature, of for example, 1100° F.– 1900° F. It is also known that brazed parts fail in subsequent use as a function of both the total stress in the brazing material in the joint and the distribution of that stress. Uneven distribution of stress produces potential points of failure during use and for this reason an attempt is usually made to insure uniform thickness of the braze joint.

In the attachment of carbide inserts to steel by brazing where the insert is entirely or substantially completely surrounded by steel it is critically important to avoid uneven stress in the braze material between the parts, and this is usually accomplished by closely controlling the tolerance on the internal dimension of the bore in the steel and the external dimension of the mating carbide insert. Even when such care is exercised, premature failure is often encountered due to stresses developed during use. A particularly severe application of this type is that of inserts for tongs used in handling hot sheet glass since the extreme changes in temperatures which occur upon contact with the hot glass repeat the stresses in the braze material and cause failure by dislodgement of the carbide insert.

It is the primary object of this invention to provide a method for joining a cemented carbide insert to a steel body substantially surrounding it which overcomes the heretofore encountered difficulties in making such an article.

A further object of this invention is to provide a method for making articles having a ferrous body and a carbide insert fastened in a bore in the body which is inexpensive and simple to perform, and which forms an article having substantially improved resistance to failure by dislodgement of the insert from the body during use.

Another object of this invention is to provide an article having a steel body and a carbide insert fastened in a bore in the body by means which permit thermal expansion and contraction of the body and insert without creating stress in the means fastening the parts together.

A still further object is to provide a steel screw having a carbide insert positioned in a bore in the screw and projecting from one end thereof to form a carbide tip wear surface which is especially adapted for use as an insert in tong devices for handling hot sheet glass.

Other objects and advantageous features of the invention will become apparent upon considering the inventive principles hereinafter disclosed in detail by reference to illustrative embodiments thereof shown on the accompanying drawing wherein:

FIGURE 1 is a side elevational view, partly in section, of an illustrative tong embodiment;

FIGURE 2 is an enlarged partial view of the device shown in FIG. 1;

FIGURE 3 is a sectional view taken along the line 3—3 in FIG. 1; and

FIGURE 4 is a sectional view of an alternative embodiment of the invention.

Referring to the embodiment shown in FIGS. 1-3, it may be seen that there is provided a screw or bolt member, generally designated 10, having a head portion 14, a threaded shank portion 12, the outer end portion 16 of shank 12 being provided with a cylindrical aperture or blind bore 44 adapted to receive a carbide insert generally designated 18.

By referring to FIG. 2, it may be most easily seen that carbide insert 18 has a body portion 30 integrally connected with a forwardly extending tip portion generally designated 22, which tip 22 is of reduced diameter relative to body portion 30. Tip 22 includes a shank portion 24 which terminates at its outer extremity in a contact surface 26 which is adapted for direct engagement with a glass plate, for example, but it will be appreciated that the shape of shank portion 24 may be varied as desired, for example to a conical form as illustrated in the modification shown in FIG. 4. Tip 22 is merged into larger diameter body portion 30 by the connecting portion 32 which at its periphery is defined by the inclined, tapered or conical surface 34, which abutment surface serves an important function in fastening the insert in place to provide the improvements which characterize the invention. While abutment surface 34 is shown in the preferred form of a tapered surface extending from the smaller diameter shank 24 of tip 22 to larger diameter body portion 30, it may have a variety of other satisfactory forms including, for example, a square shoulder, a concave or convex rounded contour, a multi-angle planar configuration, a rib, a groove of simple or complex contour, etc. That the particular shape of abutment surface 34 is unimportant to the accomplishment of the objectives of this invention will become more clear upon consideration of the hereinafter set forth discussion of the floating or breathing relative motions of the body and insert during use.

Body portion 30, as shown in FIG. 2 is provided on its inner end with a tapered or inclined surface 38 which terminates at its inner end in a square end surface 40.

Inclined surface 38 is not necessary and other configurations may be used, but it is advantageous in guiding the insert into bore 44 during initial assembly and serves to decrease the pressure per unit area of contact with the mating portions 46, 48 of bore 44 which result from longitudinal forces 64 applied to contact surface 26.

Bore 44 is a straight, centrally located axially extending cavity defined at its outer end by a straight cylindrical wall and at its inner end by inclined surface 46 and bottom surface 48. Bore 44 may be formed by conventional drilling or end milling and the diameter of the bore is suitable as long as it is larger than the outside diameter of body 30. It is unnecessary to maintain close tolerances on bore 44 and ease of assembly is insured when the diameter is such as to enable free mounting of insert 18 therein by moving insert 18 into bore 44 until abutment surface 38 is seated on mating surface 46. In this position it is preferred that rear wall 40 is slightly spaced from surface 48.

With carbide insert 18 in place in bore 44, the assembly is completed by cold forming or upsetting a portion of the outer end 16 of shank 12 inwardly and downwardly into pressure contact with abutment surface 34 to form a metal to metal seal or closure 52. This cold upsetting is easily performed by rolling, swaging, punching or the like and forces insert 18 into tight pressure contact with the load receiving inner end surfaces 46, 48 of bore 44. The upset metal closure 52 merely forms a tight fitting, integral ring around the shank portion 24 of insert 18 and does not effect chemical union between the carbide and steel or an adhesion between them which is comparable to the bond obtained from brazing.

In use, forces applied to contact surface 26 in the direction of arrows 64 or 66 are either transmitted directly to surfaces 46, 48 or to closure 52. When the unit is employed in a body member 19 such as glass tongs, for contact with a hot glass sheet surface, for example, contact surface 26 transmits heat into body portion 30 and to shank portion 16. As the temperature increases, the steel portions expand and the carbide insert expands, but because the steel expands at a faster rate, bore 44 tends to become larger in diameter and length than the enclosed insert 18 and thus to move away from tight fitting contact between closure member 52 and abutment surface 34. In this relative movement, insert 18 tends to float or breathe in bore 44, and with axial force being applied along arrow 64, insert 18 moves inwardly in bore 44 and maintains constant contact with load receiving surfaces 46, 48. No stress is introduced into closure means 52 by the different total relative expansions, and after removal from contact and as the temperature decreases to normal room temperature, the original relationship of the parts is established. Tests have shown that the use of breathing screw of this invention for handling hot sheet glass is greatly superior to the use of screws having carbide inserts brazed in place by using carefully controlling brazing procedures.

As above pointed out, bore 44 may be in the form of a blind hole but, if desired, the improved articles of this invention may be formed by the modified method used to form the modified form of the invention shown in FIG. 4. In FIG. 4, a screw or bolt member generally designated 110, having a head portion 114 and a threaded shank portion 112 is first provided with a centrally located axial bore 144 extending throughout the length of the member 110. The diameter of the bore 144 is slightly larger than the external dimension of the carbide insert 118 for the reasons explained hereinabove in connection with FIGS. 1-3. Carbide insert 118 has an enlarged body portion 130 and a smaller diameter shank portion 122 connected to the body portion 130 by tapered abutment surface 134, and terminating in its forward end in a conical nose portion. The article is formed by first positioning the carbide insert 118 into bore 144, then positioning a plug 170 in the rearward portion of bore 144, and then spinning a portion of the forward end of the threaded portion of shank 112 into tight pressure contact with abutment surface 134 to thus form a closure means 158, generally comparable to that described above in connection with FIGS. 1-3. The plug 170 may be secured in bore 144 by brazing, welding, or other conventional attachment means such as a driving pressure fit or the like.

It will be apparent to those skilled in the art that the inventive principles above set forth as applied to the fastening of the carbide insert in a threaded member is equally applicable to non-threaded parts having any of a wide variety of head members. The advantages of the invention are attained so long as a carbide insert is provided having a body portion of large diameter, a shank portion of smaller diameter integrally connected to the body portion by an abutment surface, a ferrous member provided with a bore slightly larger in diameter than the external diameter of the body portion of said insert, said ferrous member being formed from a material capable of being cold upset into pressure contact with the abutment surface between the large and small diameter portions of the carbide insert. Since other alternative forms of the invention may readily occur to those skilled in the art, it is intended that the scope of the appended claims be construed to include alternative forms of the inventive principles here disclosed.

As used throughout this specification and in the appended claims, the expression "cemented carbide" is intended in its conventionally understood sense to include the carbides of one or more of the heavy metals such as tungsten, titanium, vanadium, columbium, tantalum, etc., and including other hard carbides such as chromium carbide, boron carbide, and the like, cemented by sintering into solid form by a metal such as cobalt, nickel or mixtures thereof.

What is claimed is:

1. An article comprising a ferrous elongated body member, a cylindrical bore in said body member, a cemented carbide member having a body portion and a shank portion, said shank portion extending outwardly from said body portion and integrally united thereto by an abutment portion, said body portion positioned in said cylindrical bore so that the inner end of said body member is adjacent the bottom surface defining the inner extremity of said bore and said abutment portion is adjacent to the cylindrical wall defining the outer extremity of said bore, and a closure member integral with the said cylindrical wall in abutting surface engagement with said abutment portion of said cemented carbide member.

2. A composite article comprising a ferrous cylindrical member having an axially extending cylindrical bore therein, a cemented carbide member having a body portion and a shank portion, said shank portion connected to said body portion by an abutment portion, said body portion positioned in said bore so that the end surface thereof opposite said shank portion is adjacent to the bottom surface defining the inner extremity of said bore, and a closure member in pressure contact with said abutment portion, said closure member being a portion of the cylindrical wall defining the outer end extremity of said bore formed to yieldably abut said abutment portion.

3. An article in accordance with claim 2 wherein said cylindrical member is a screw.

4. A composite article comprising a ferrous cylindrical threaded body member, an axially extending blind bore in said body member, a cemented carbide member having a body portion and a shank portion extending outwardly from said body portion and integrally united to said body portion by an abutment portion, said body portion positioned in said blind bore so that the end surface of said body portion opposite to said shank portion is adjacent to the bottom surface of said blind bore, a closure member integral with the cylindrical wall of said bore defining the outer end extremity thereof in pressure engagement with said abutment portion of said carbide member.

5. An article in accordance with claim 4 wherein the inner end of said bore is provided with an inclined surface joining the bottom surface of said bore with the peripheral wall thereof.

6. An article in accordance with claim 5 wherein the end of the cemented carbide member opposite said shank portion has a tapered surface joining the periphery of said body to its end surface.

7. An article in accordance with claim 4 wherein said shank portion of said carbide member is cylindrical in shape.

References Cited by the Examiner

UNITED STATES PATENTS

| | | | |
|---|---|---|---|
| 798,769 | 9/05 | Dye | 294—1 |
| 1,477,073 | 12/23 | Paine | 294—1 |
| 1,937,313 | 11/33 | Brotz | 251—218 |
| 2,724,893 | 11/55 | O'Connor et al. | 29—511 |
| 2,843,926 | 7/58 | Turner | 29—511 |
| 3,010,753 | 11/61 | Russ | 294—118 |

SAMUEL F. COLEMAN, *Primary Examiner.*

WHITMORE A. WILTZ, ERNEST A. FALLER, Jr.,
*Examiners.*